No. 801,340. PATENTED OCT. 10, 1905.
F. SCHITKA.
STOVE FOR HEATING FLAT IRONS.
APPLICATION FILED MAY 27, 1903.

3 SHEETS—SHEET 1.

Witnesses:
L. Staaden.
M. E. Diamond.

Inventor
Ferdinand Schitka
by Alfred Müller
Attorney.

No. 801,340. PATENTED OCT. 10, 1905.
F. SCHITKA.
STOVE FOR HEATING FLAT IRONS.
APPLICATION FILED MAY 27, 1903.

3 SHEETS—SHEET 2.

Witnesses:
L. Staaden.
M. E. Desmond.

Inventor
Ferdinand Schitka
by Alfred Müller
Attorney.

No. 801,340. PATENTED OCT. 10, 1905.
F. SCHITKA.
STOVE FOR HEATING FLAT IRONS.
APPLICATION FILED MAY 27, 1903.

3 SHEETS—SHEET 3.

Witnesses
L. Staaden.
M. E. Desmond.

Inventor
Ferdinand Schitka
by Alfred Mill,
Attorney.

UNITED STATES PATENT OFFICE.

FERDINAND SCHITKA, OF VIENNA, AUSTRIA-HUNGARY.

STOVE FOR HEATING FLAT-IRONS.

No. 801,340.          Specification of Letters Patent.          Patented Oct. 10, 1905.

Application filed May 27, 1903. Serial No. 158,929.

*To all whom it may concern:*

Be it known that I, FERDINAND SCHITKA, a citizen of Austria, residing at Vienna, Province of Lower Austria, Austria-Hungary, have invented certain new and useful Improvements in Stoves for Heating Flat-Irons, of which the following is a full, clear, and exact specification.

The present invention relates to a stove for heating simultaneously a plurality of flat-irons, and the stove is intended more particularly for use with gas and adapted for economically heating the irons.

Figure 1:
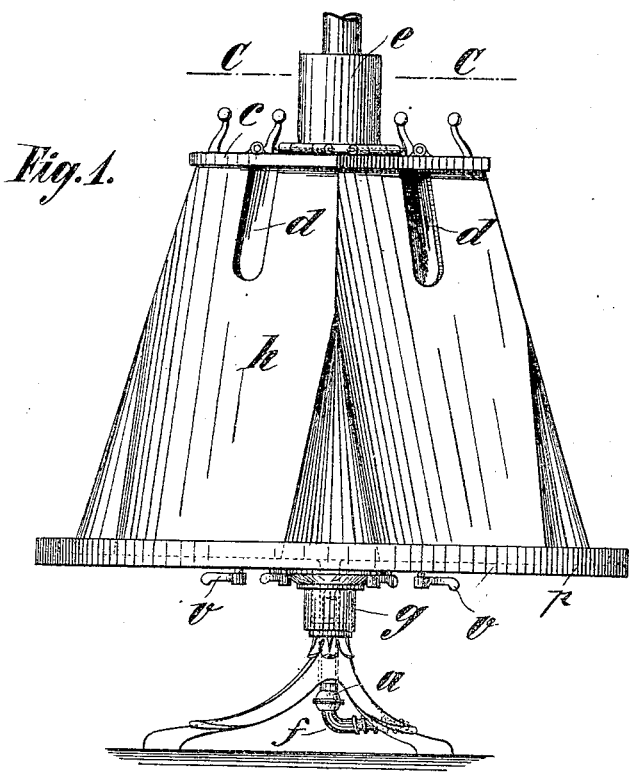
Figure 2:
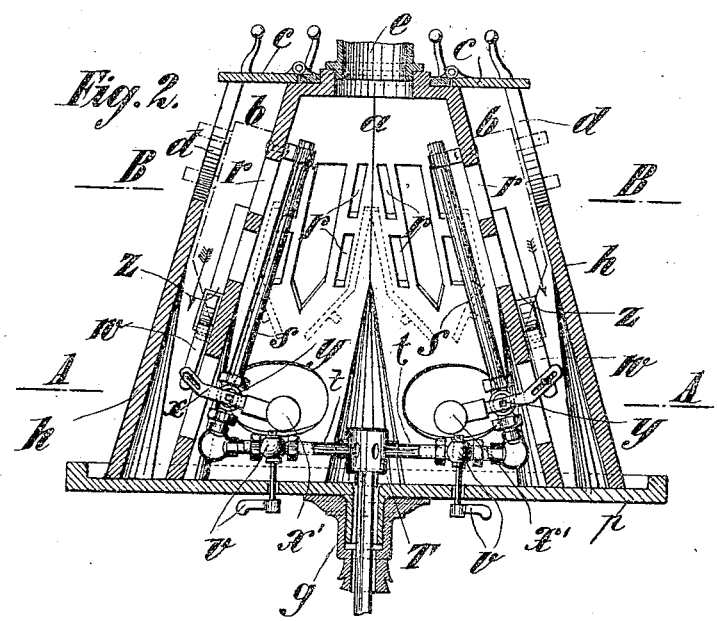
Figure 3:
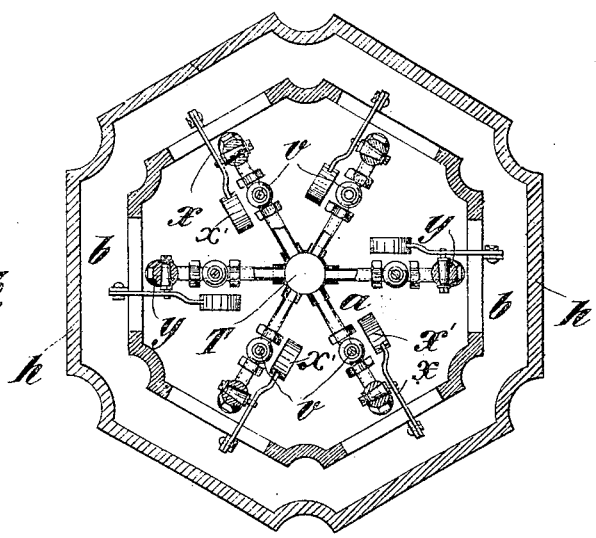
Figure 4:
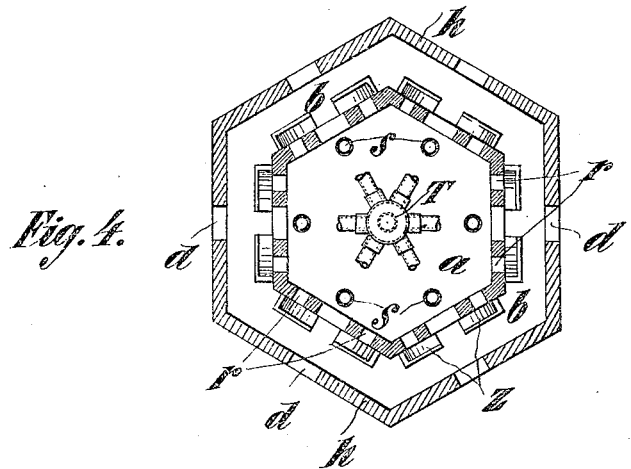
Figure 5:
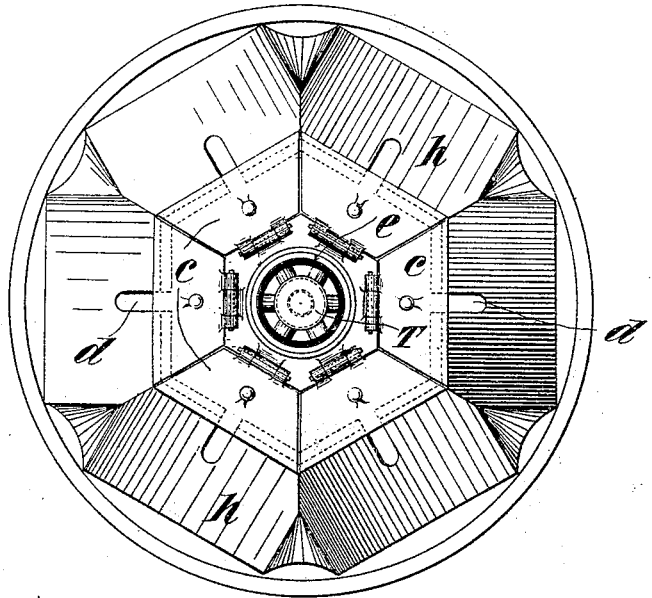
Figure 6:
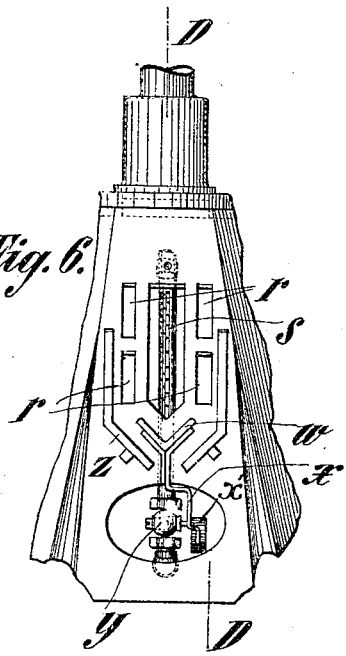
Figure 7:
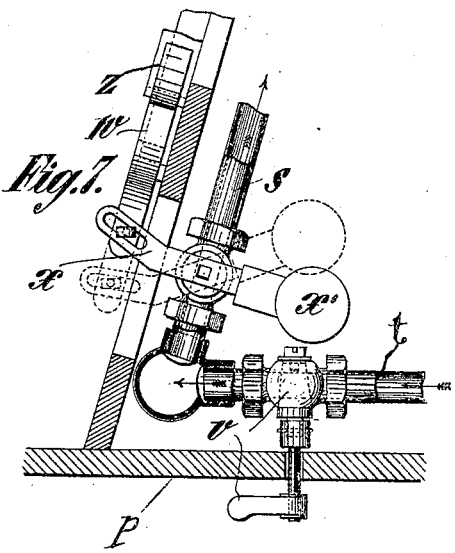

In the accompanying drawings, in which similar reference-letters refer to similar parts in all the figures, Figure 1 is an elevation of the new stove; Fig. 2, a central vertical section thereof with parts broken away; Fig. 3, a horizontal section on the line A A of Fig. 2; Fig. 4, a similar section on the line B B of Fig. 2, not showing parts that would appear in plan in such a view; Fig. 5, a plan view, partly in section, on the line C C of Fig. 1; Fig. 6, a fragmental view showing the heating-body; Fig. 7, a section on the line D D of Fig. 6, on an enlarged scale.

$a$ is the heating-body, polygonal in cross-section and surrounded by casing $h$ of similar shape, which, as shown in Figs. 1 and 2, is provided with slots $d$ to receive the handles of the irons and in its top portions with covers $c$, hinged to the heating-body $a$ to enable the irons to be placed upon the heating-body in the open space $b$ between said body and the casing $h$ and to be removed therefrom. The heating-body $a$ and the casing $h$ surrounding the same are placed upon a base-plate $p$, which is carried by a rotary support $g$, and thus may be swung around so as to bring each part of the stove within convenient reach of the operator.

The heating-body $a$ is provided with openings $r$, behind which openings gas-burner pipes $s$ are arranged, as seen from Figs. 2 and 4, so that the flames may strike directly against the smoothing-surfaces of the irons placed opposite said openings. The pipes $s$ are supplied with gas from a common pipe T, which passes through the rotary support $g$ and is connected with the burner-pipes $s$ by branch pipes $t$, each branch pipe $t$ being supplied with a cock $v$, whereby the gas to the burner-pipes $s$ may be turned on or off at will. The gas is supplied to the pipe T by a gas-tube $f$, a hollow joint $u$ being interposed between said tube $f$ and the pipe T, so as to enable the stove to be swung around its support. For the escape of the products of combustion a discharge-pipe $e$ is arranged in the top of the stove.

In order to stop the gas-supply when a flat-iron is removed, the following arrangement is provided: Below each of the openings $r$ in the heating-body $a$ there is provided a movable piece $w$, the upper end of which is shaped to receive in it the point of the iron to be heated. The piece $w$ is carried by the arm of a centrally-pivoted lever $x$, the pivot of the lever forming the stem of a valve $y$, disposed in the burner-pipe S. The other arm of the lever is normally held down by a weight $x'$ in the position shown in full lines in Fig. 7, thereby closing the valve $y$. When, however, a flat-iron is placed on the piece $w$, the iron overcomes the weight on the other arm of the lever, thus turning the lever, with its pivot, and opening the valve $y$. The gas passing into the tube $s$ may now be lighted by a pilot-burner or by hand. When a flat-iron is removed from the piece $w$, the weight on the arm of the lever lifts again the piece $w$, thereby closing the valve $y$ and cutting off the gas-supply to the burner $s$. Stops $z$ are arranged on the outside of the heating-body $a$ to limit the downward movement of the pieces $w$.

Having now described the nature of my invention, what I claim is—

1. In a stove for heating simultaneously a plurality of flat-irons, the combination with a heating-body polygonal in cross-section and having openings therein, of a casing surrounding said heating-body and thereby confining the heat in said body, gas-burner pipes arranged behind said openings in said heating-body, one pipe being provided for each flat-iron to be placed over said openings, movable pieces for receiving the irons and valves arranged in said gas-burner pipes and connected with said movable pieces respectively, the weight of the irons placed on said movable pieces being adapted to open said valves, and a weight for closing each valve after the removal of the corresponding iron.

2. In a stove for heating simultaneously a plurality of flat-irons, the combination with a heating-body polygonal in cross-section and having openings therein of a casing surrounding said heating-body and provided with slots, gas-burner pipes arranged behind said openings in said heating-body, one pipe being provided for each flat-iron to be placed over said openings, movable pieces for receiving the irons and valves arranged in said gas-burner pipes and connected with said movable pieces respectively, the weight of the irons placed on said movable pieces being adapted to open said valves, a weight for closing each valve after the removal of the corresponding iron and a platform adapted to carry all the said parts and to turn around its axis.

In testimony that I claim the foregoing as my invention I have signed my name in presence of two subscribing witnesses.

FERDINAND SCHITKA.

Witnesses:
 WILHELM ZERGER,
 ALVESTO S. HOGUE.